(12) United States Patent
Behnke

(10) Patent No.: US 6,672,185 B1
(45) Date of Patent: Jan. 6, 2004

(54) MACHINING STABILIZER

(76) Inventor: Jeffrey H. Behnke, 1025 Breezewood La., Neehnah, WI (US) 54956

( * ) Notice: Subject to any disclaimer, the term of this patent is extended or adjusted under 35 U.S.C. 154(b) by 0 days.

(21) Appl. No.: 10/391,568

(22) Filed: Mar. 20, 2003

(51) Int. Cl.[7] ............................................... B23B 25/00
(52) U.S. Cl. ........................................... 82/162; 82/164
(58) Field of Search ........................ 82/162, 164, 170; 279/133

(56) References Cited

U.S. PATENT DOCUMENTS

| | | | |
|---|---|---|---|
| 2,958,556 A | | 11/1960 | Samuelson et al. |
| 4,519,279 A | * | 5/1985 | Ruggeri ........................ 82/162 |
| 4,650,237 A | * | 3/1987 | Lessway .................. 294/119.1 |
| 4,754,673 A | | 7/1988 | Hiestand |
| 4,810,019 A | | 3/1989 | Brucher |
| 5,860,341 A | * | 1/1999 | Visigalli ........................ 82/164 |

* cited by examiner

Primary Examiner—Willmon Fridie, Jr.
(74) Attorney, Agent, or Firm—Russell L. Johnson Patent Agent

(57) ABSTRACT

A stabilizer is disclosed, for suppressing vibrations and whip during the machining long cylindrical work pieces. A mover causes arms to move away from the work piece when the mover is retracted and to move towards the work piece when the mover is extended. The positioning of links and pivots enables the arms to be moved a significant distance when the mover is moved a short distance and thereby permits the use of the stabilizer between a guard and the path of movement of the work piece. The mover is provided with adjustments for changing the force with which the mover acts and to adjust the force applied to the work piece.

8 Claims, 5 Drawing Sheets

MACHINING STABILIZER

BACKGROUND OF THE INVENTION

1. Field of the Invention

This invention relates to a machining stabilizer for the mid-span of long cylindrical work pieces.

More particularly, this invention relates to a stabilizer for machines used in cutting cores from long tubular stock.

In general, a number of problems are associated with the machining of long cylindrical work pieces. When machining a long work piece supported at only one end, vibrations and whipping of the free end of the work piece are problems that must be addressed to permit proper machining. When machining a long work piece that is supported at both ends, bowing of the mid-span and vibrations are problems that must be addressed to permit proper machining. When machining a long work piece where the machining is being performed in the mid-span, support against tool thrust and configurations that permit the passage of the tool through the location of the stabilizer are important. When the machining is done at high rotational speeds, the problems are exacerbated.

In general, the mechanisms of this invention can be modified to deal with the problems associated with the machining of a specific long work piece as recited above without departing from the scope of the invention. To apply the stabilizer to a specific task it is necessary to configure the stabilizer to serve the demands of the specific task.

The stabilizer of this invention was developed to stabilize the mid-span of tubular cores being cut on high speed core cutters wherein the method of feeding a new length of core stock involves a head moving along guides to a supply of core stock and acquiring a new length of core stock after which the head is returned to the opposite end of the guides to commence cutting. This process involves the head moving through the location of the stabilizer. The stabilizer of this invention is configured so as to move a pair of stabilizer arms out of the path of the head and return the arms to their operating position once the head has passed their location on the head's return trip. It is prudent and often required that such machines be fully guarded which adds the requirement that the stabilizer perform its functions within a confined space. Another requirement is that the stabilizer not crush or deform the core and serve to maintain positioning of the core along the centerline of the core cutter while damping out vibrations and suppressing whipping of the free end of the core.

2. Description of the Related Art

The known prior art is replete with steady rests, guides, and backup tools that are positioned in the mid-span of long work pieces that are being machined. Each of these mechanisms has been given specific configurations to serve specific tasks. These prior mechanisms contain some attributes in common with this invention and other attributes that are specific to the task that they are designed to perform. The following patent references represent the prior art most closely related to the stabilizer of this invention.

U.S. Pat. No. 2,958,556 to Samuelson et al. teaches a bottle take out jaw mechanism having a mounting platform, a mover connected to the platform, two arms pivotably connected to the platform, linkages connected to the free end of the mover and to each of the arms and the mechanism operates so that the arms are moved apart as the free end of the mover is advanced towards the work piece. In counter-distinction, the arms of the instant invention are moved apart as the free end of the mover is moved away from the work piece.

U.S. Pat. No. 4,810,019 to Brucher teaches a collet chuck for gripping round objects having two arms pivotably connected to a head, a mover connected to the head, arms pivotably connected to the head, multiple rollers rotatably connected to the arms, and the arms are moved by a multiplicity of links connected to the free end of the mover so that when the rollers are in contact with a cylindrical work piece the work piece is centered between the arms. The apparatus operates to move the arms apart when the free end of the mover is moved towards the work piece.

U.S. Pat. No. 4,754,673 to Hiestand teaches a self centering steady rest that provides adjustments to compensate for elastic deformation of holding members. The holding members move away form the work piece as the free end of the mover moves away from the work piece.

The mover of this invention is self centering and of compact and sturdy construction. The prior art does not teach linkages that connect a mover to arms that are moved away from a work piece when the free end of a mover is moved away from the work piece. Further, the prior art does provide a stabilizer as described, wherein the linkage is such that the arms move through a large angle in response to a short movement of the mover. Further, the prior art does not provide a stabilizer as described wherein the force applied to the work piece by the stabilizer is significantly less than the force present at the free end of the mover.

BRIEF DESCRIPTION OF THE INVENTION

This invention is for a stabilizer for long cylindrical work pieces comprising: a mounting platform, a mover connected to the platform and the mover has a line of action that is perpendicular to the centerline of the work piece and the mover serves to move a central pivot along the line of action towards and away from the centerline of the work piece, a first arm and a second arm pivotably connected to the mounting platform, and the arms are equally spaced to either side of a plane defined by the centerline of the work piece and the line of action of the mover and the arms project from the mounting platform in the direction of the work piece, and the arms have a length approximately equal to the distance between the platform and the work piece, a first link and a second link pivotably connected to the central pivot and the first link is pivotably connected to the mid-length of the first arm and the second link is pivotably connected to the mid-length of the second arm and the links are angled from the pivot towards the platform, a first roller carrier pivotably connected to the first arm near the end of the arm and on the side of the arm nearest the centerline of the work piece and a second roller carrier pivotably secured to the second arm and on the side of the arm nearest the work piece and the first and second carriers have rotatably secured therein at least two rollers and the rollers are positioned in the carrier so that when the outside perimeters of the rollers are in contact with the work piece the carriers will pivot so that the rollers are in contact with the work piece at equal distances from the centerline of the work piece, and the axes of rotation of the rollers and pivot axes of the pivots are parallel to the longitudinal centerline of the work piece.

BRIEF DESCRIPTION OF THE DRAWINGS

FIG. 1 is a schematic front elevation view of the stabilizer of this invention illustrating the extended and retracted positions of the stabilizer arms relative to the space the arms have to work in.

DETAILED DESCRIPTION OF THE INVENTION

Figure 1:
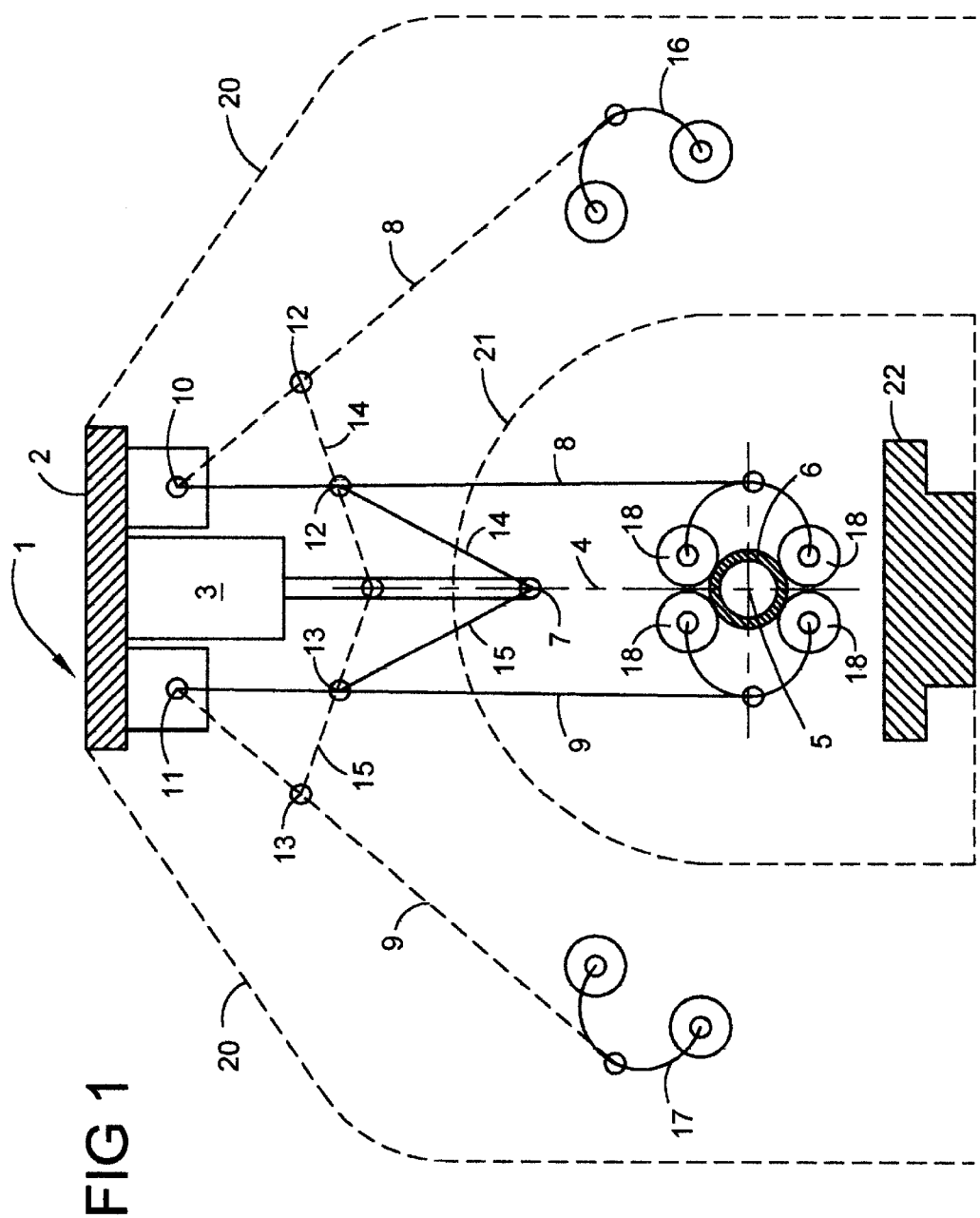

In the drawings like numbers refer to like objects and the proportions of some parts of the invention have been modified to facilitate illustration.

Figure 2:
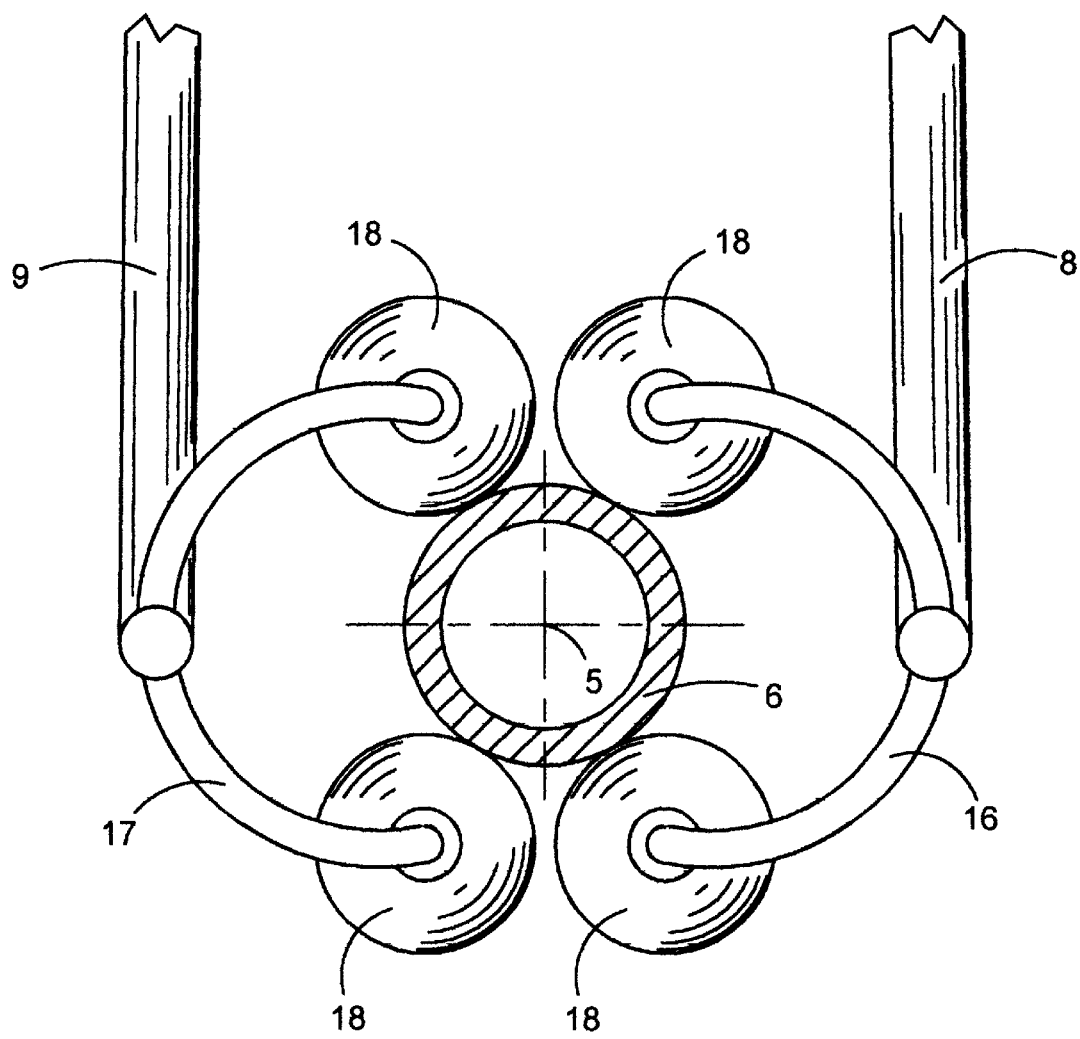
FIG. 2 is an enlarged view of the roller guides in contact with a work piece.

Referring now to FIGS. 1 and 2 in which the basic invention is shown schematically. Stabilizer 1 is assembled on mounting platform 2 and mover 3 is connected to platform 2 with the line of action 4 of mover 3 perpendicular to the longitudinal centerline 5 of cylindrical work piece 6 and mover 3 serves to move a central pivot 7 towards and away from centerline 5. A first arm 8 and a second arm 9 are pivotably connected to platform 2 at pivots 10 and 11 respectively. Pivots 10 and 11 are positioned equal distances from a plane defined by the line of action 4 and centerline 5 and arms 8 and 9 project from pivots 10 and 11 in the direction of work piece 6, and the arms have a length that is approximately the distance from platform 2 to work piece 6. First link 14 and second link 15 are pivotably connected to central pivot 7 and first link 14 is pivotably connected to first arm 8 at pivot 12 and second link 15 is pivotably connected to second arm 9 pivot 13 and links 14 and 15 are angled from central pivot 7 towards mounting platform 2. First roller carrier 16 is pivotably connected to first arm 8 near the free end of arm 8 and on the side of arm 8 nearest to work piece 6, and second roller carrier 17 is pivotably connected to second arm 9 near the free end of arm 9 and on the side of arm 9 nearest to work piece 6. First carrier 16 and second carrier 17 have rotatably secured thereon at least two rollers 18. Rollers 18 are positioned on carriers 16 and 17 so that when rollers 18 are in contact with work piece 6, carriers 16 and 17 will pivot so that rollers 18 are equidistant from centerline 5. The axes of rotation of rollers 18 and the pivot axes of all the pivots recited above are parallel to centerline 5.

In FIG. 1, the outer dashed lines serve to show the location of a shield or hood 20 while inner dashed lines serve to show the area that might be passed through by a machining head 21 as it moves along guide 22.

Stabilizers such as stabilizer 1 are to a significant extent task specific. It should be understood, that although the stabilizer as disclosed herein is disclosed as being task specific, the simplicity, compactness and novel attributes of the stabilizer of this invention would suggest that less sophisticated embodiments of the invention would lend it to applications less demanding than those disclosed hereinafter.

In FIG. 1 arms 8 and 9 are shown solid in the extended position and dashed in the retracted position. In a core cutting operation a cutting head 21 is traversed along guide 22 past the location of stabilizer 1 with arms 8 and 9 retracted. At the far end of the traverse, the head acquires a new length of core stock and returns to the near end of guide 22. After head 21 has passed the location of stabilizer 1, arms 8 and 9 are extended so that rollers 18 contact work piece 6, which is the core stock, and centers it along the rotational axis of cutting head 21.

It should be noted that pivots 12 and 13 are near pivots 10 and 11 and that links 14 and 15 are angled from pivot 7 towards pivots 10 and 11. The result is that when central pivot 7 is retracted, a short distance, arms 8 and 9 are pivoted upward and outward a considerable distance and that stabilizer 1 can thereby satisfy the requirement that it provide a clear path for head 21 while operating under hood 20.

It should further be noted that the placing of pivots 12 and 13 near to pivots 10 and 11 and the angling of links 14 and 15 with arms 8 and 9 provides a geometry wherein the inward directed forces, perpendicular to arms 8 and 9 at pivots 12 and 13 are considerably greater than the inward directed forces perpendicular to arms 8 and 9 at carriers 16 and 17. This enables stabilizer 1 to satisfy the requirement that the stabilizer be self centering and not apply pressures on the work piece that are sufficient to crush or distort a tubular work piece. The principle is that a large force input at pivot 7 will result in a much smaller force output at carriers 16 and 17 and therefore require a large change in force at pivot 7 to produce a small change in force at carriers 16 and 17. This provides stabilizer 1 with the capacity to make small adjustments in the pressure exerted on work piece 6 by rollers 18. This permits the "tuning" of stabilizer 1 to damp out vibrations developed in work piece 6.

The above disclosures would enable one skilled in the art to make and use the stabilizer of this invention for its intended purposes without undue experimentation.

The following disclosures teach the best mode of practicing the invention known to the inventor at the time of filing his patent application.

Stabilizer 31 is task specific to a core-cutting machine wherein a cutting head must pass through the location of stabilizer 31 to acquire a work piece 36 and return with it to a cutting position. Stabilizer 31 then acquires work piece 36 and centers it along centerline 35 and cutting commences.

Figure 3:
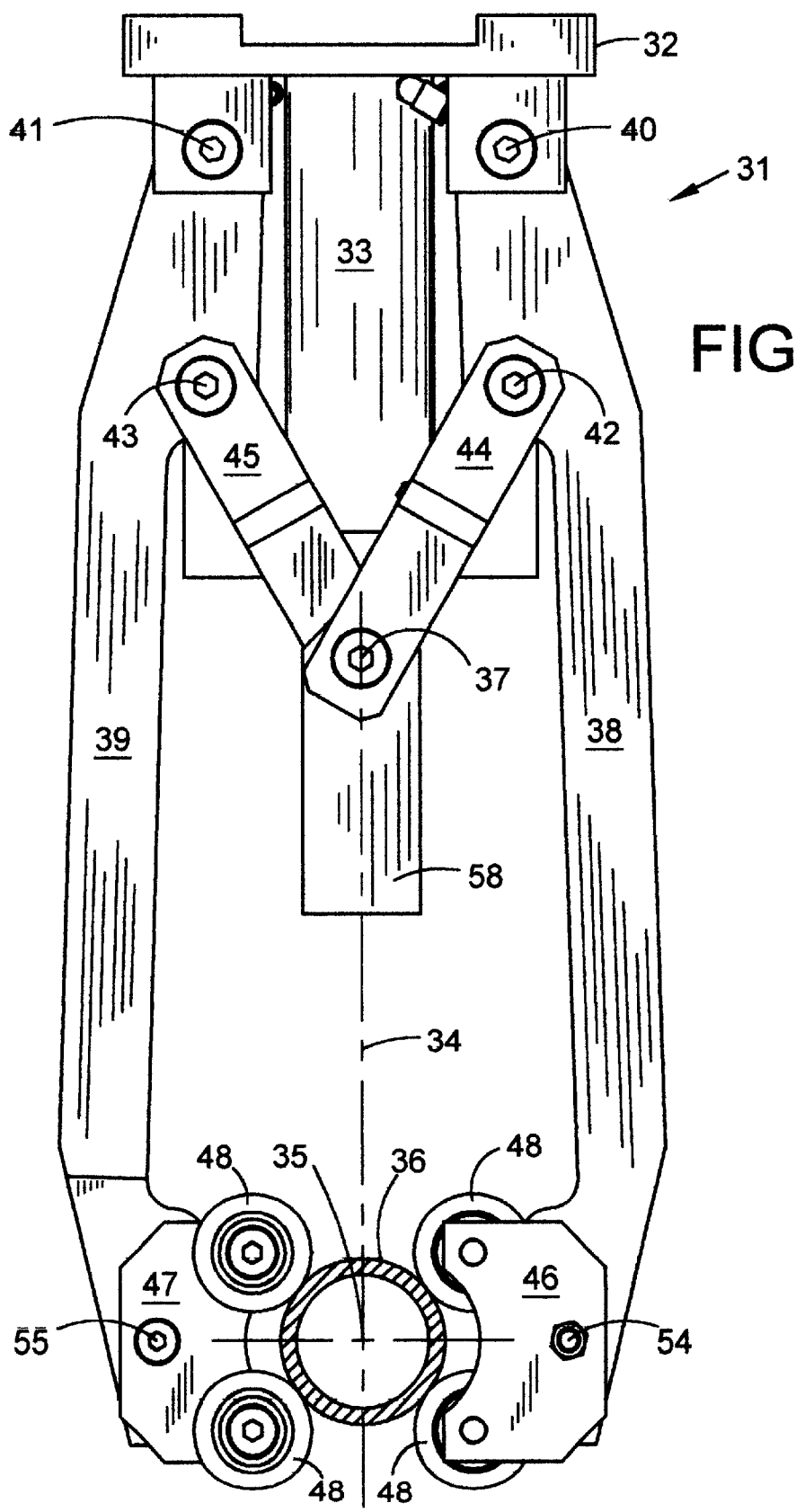
FIG. 3 is a front elevation view of a preferred embodiment of the stabilizer of this invention.
Figure 4:
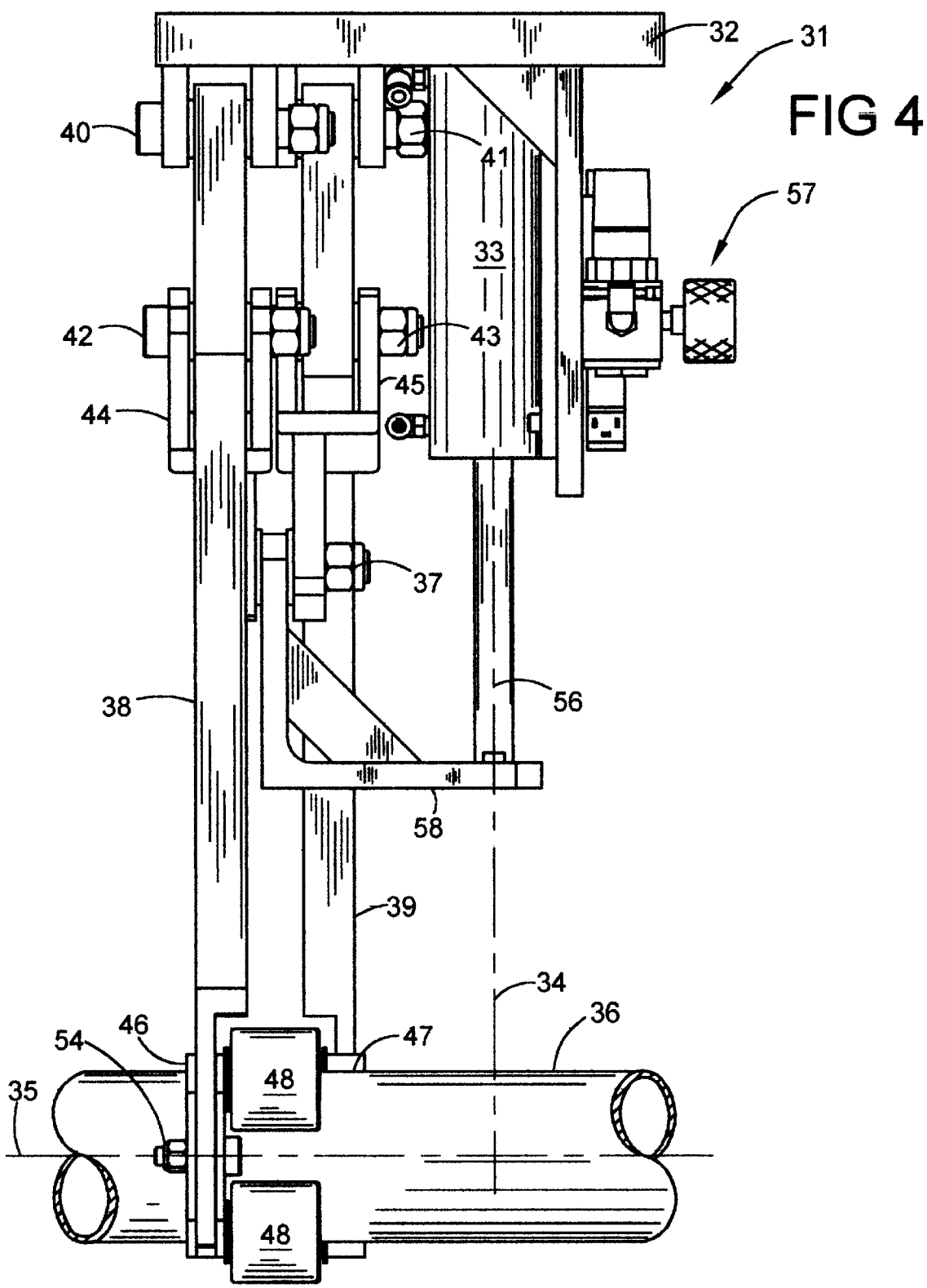
FIG. 4 is a side elevation view of the stabilizer of FIG. 3
Figure 5:
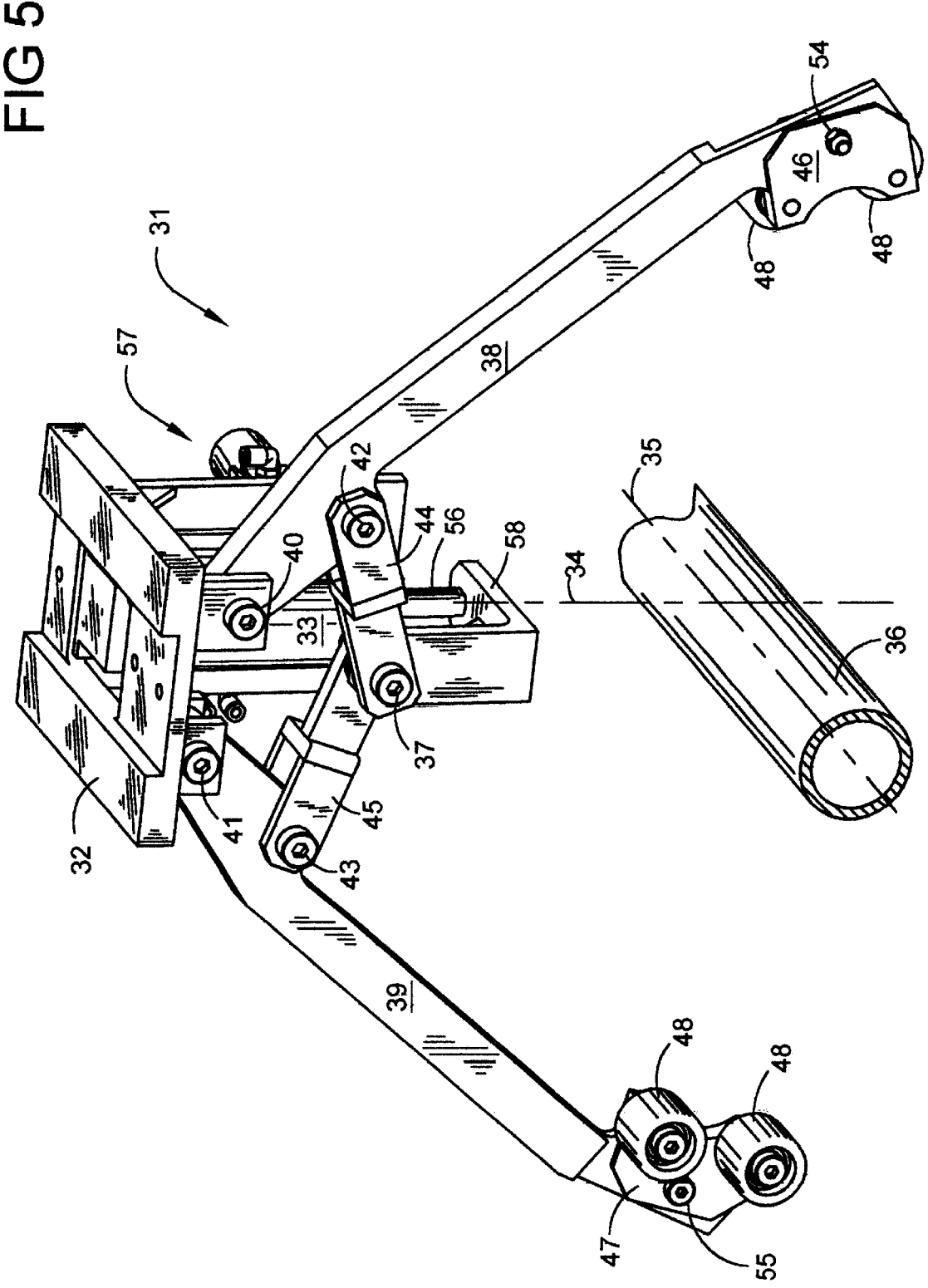
FIG. 5 is a perspective view of the stabilizer of FIG. 4.

Referring now to FIGS. 3, 4, and 5 wherein a stabilizer 31 is employed in the cutting of long tubular work piece 36 is disclosed. A mounting platform 32 has a mover 33 secured thereto and mover 33 has a line of action 34 that is perpendicular to centerline 35 of work piece 36 and mover 33 serves to move central pivot 37 towards and away from centerline 35 of work piece 36. A first arm 38 and a second arm 39 are pivotally connected to platform 32 by means of pivots 40 and 41 and pivots 40 and 41 are equally spaced to either side of a plane defined by line of action 34 and centerline 35 of work piece 36. Arms 38 and 39 project from platform 32 in the direction of work piece 36 and arms 38 and 39 have a length that is approximately equal to the distance from platform 32 to centerline 35. A first link 44 and a second link 45 are pivotally connected to central pivot 37 and first link 44 is pivotally connected to first arm 38 at pivot 42 and second link 45 is pivotally connected to second arm 39 at pivot 43 and links 44 and 45 are angled from pivot 37 towards platform 32. First roller carrier 46 is pivotally connected to first arm 38 by means of pivot 54 near the end of arm 38 and on the side of arm 38 nearest centerline 35 of work piece 36 and a second roller carrier 47 is pivotally secured to the second arm 39 by means of pivot 55 and on the side of arm 39 closest to centerline 35 of work piece 36. First and second carriers 46 and 47 each have rotatably secured thereon two rollers 48 and rollers 48 are positioned on carriers 46 and 47 so that when the outside perimeters of rollers 48 are in contact with the work piece, carriers 46 and 47 will pivot so that the rollers 48 are in contact with work piece 36 at equal distances from centerline 35. The axes of rotation of rollers 48 and the pivot axes of the pivots of stabilizer 31 are all parallel to centerline 35.

The mechanisms of stabilizer 1 of FIGS. 1 and 2 are employed in stabilizer 31. However, the mechanisms are given task specific configurations. Mover 33 is in the form of a cylinder such as a hydraulic, pneumatic, or solenoid cylinder, which extends a mover rod 56 towards and away from centerline 35. Mover 33 is provided with adjustments 57 which enable the adjustment of the force with which mover rod 56 acts. A transition link 58 serves to locate pivot 37 to the side of mover 33 and towards mounting platform 32 while keeping the line of action of pivot 37 parallel to the line of action 34 of mover 33 and intersecting with centerline 35. The displacement of pivot 37 to the side of mover 33 and towards platform 32 along with the locations of pivots 42 and 43 near to pivots 40 and 41 permits the raising of arms 38 and 39 with a shorter travel of mover rod 56 than would be possible had pivot 37 been secured directly to the end of mover rod 56. This permits stabilizer 31 to occupy less space and still perform its tasks.

As shown in FIGS. 4 and 5, links 44 and 45 are positioned one on each side of transition link 58 and arms 38 and 39 are offset from each other so that arms 38 and 39 rotate in separate planes perpendicular to centerline 35. Rollers 48 on carrier 46 project towards arm 39 and rollers 48 on carrier 47 project towards arm 38 so that all rollers 48 are aligned when they are in contact with work piece 36.

The positioning of pivots 42 and 43 relatively close to pivots 40 and 41 also provide mechanics wherein a relatively large change in the force with which mover rod 56 acts will result in a relatively small change in the force with which rollers 48 engage work piece 36.

The use of transition link 58 to position pivot 37 closer to platform 32 than it would be at the end of mover rod 56, the adjustability of the force with which mover rod 56 acts, the use of short links 44 and 45, the positioning of pivots 42 and 43 relatively near to pivots 40 and 41, the offsetting of arms 38 and 39 and the positioning of rollers 48 so that they are in alignment with each other when in contact with work piece 36, all add incrementally to the capacity of stabilizer 31 to perform the specific tasks required of it in the specific situation in which it is employed. Those specific tasks are to provide an accurate positional hold on work piece 36 without distorting or damaging work piece 36 while damping out vibrations in work piece 36 and in the suppressing of whip in work piece 36 and to be retractable to a configuration that will fit in the small volume between the path of a cutting head and the guards of the machine.

The above disclosures would enable one skilled in the art to make and use the stabilizer of this invention without undue experimentation. It should be understood that the stabilizer of this invention could be given many specific configurations to serve specific purposes without departing from the inventive concept of the stabilizer. Therefore, the scope of this invention should not be limited to the embodiments disclosed but the scope of the invention should only be limited by the scope of the appended claims and all equivalents thereto that would be made apparent thereby.

What is claimed is:

1. A stabilizer for long cylindrical work pieces comprising:
    a) a mounting platform,
    b) a mover connected to the platform and the mover has a line of action that is perpendicular to the centerline of a cylindrical work piece and the mover serves to move a central pivot along the line of action towards and away from the centerline of the work piece,
    c) A first arm and a second arm pivotally connected to the mounting platform, and the arms are equally spaced to either side of a plane defined by the centerline of the work piece and the line of action of the mover and the arms project from the mounting platform in the direction of the work piece, and the arms have a length approximately equal to the distance between the platform and the work piece,
    d) A first link and a second link pivotally connected to the central pivot and the first link is pivotally connected to the mid-length of the first arm and the second link is pivotally connected to the mid-length of the second arm and the links are angled from the pivot towards the platform,
    e) a first roller carrier pivotally connected to the first arm near the free end of the arm and on the side of the arm nearest the centerline of the work piece and a second roller carrier pivotally secured to the second arm near the free end of the arm and on the side of the arm nearest the work piece and the first and second carriers have rotatably secured thereto at least two rollers and the rollers are positioned on the carriers so that when the outside perimeters of the rollers are in contact with the work piece the carriers will pivot so that the rollers are in contact with the work piece at equal distances from the centerline of the work piece, and
    f) the axes of rotation of the rollers and the pivot axes of the pivots are parallel to the longitudinal centerline of the work piece.

2. The stabilizer of claim 1 wherein the mover is a cylinder having an extendable and retractable mover rod centered on the line of action of the mover.

3. The stabilizer of claim 2 wherein the mover is provided with means for adjusting the force transmitted to the mover rod.

4. The stabilizer of claim 1 wherein a transition link is secured to the free end of the mover rod and the link has secured to it a central pivot that is located to the side of the mover and towards the mounting platform from the free end of the mover rod and the pivot lies in the plane defined by the line of action of the mover and the centerline of work piece.

5. The stabilizer of claim 4 wherein the first and second links are pivotally connected to the first and second arms near the mounting platform so that a short travel of the mover rod will result in a large movement of the first and second arms.

6. The stabilizer of claim 4 wherein the first arm and the second arm are pivotally secured to the mounting platform in a staggered relationship to each other so that the first arm and the second arm pivot In separate parallel planes that are perpendicular to the centerline of the work piece.

7. The stabilizer of claim 6 wherein the axes of rotation of the rollers on the first roller carrier which is pivotally connected to the first arm project in the direction of the second arm and the rollers on the second roller carrier pivotally connected to the second arm project in the direction of the first arm so that the rollers are aligned with each other when the rollers are in contact with the work piece.

8. A stabilizer for long cylindrical work pieces comprising:
    a) a mounting platform,
    b) a mover connected to the platform and the mover has a line of action that is perpendicular to the centerline of a cylindrical work piece and the mover serves to move a central pivot along the line of action towards and away from the centerline of the work piece, and the mover is a fluid activated cylinder having a mover rod that is extendable and retractable and the mover is provided with a means for adjusting the force transmitted to the mover rod, c) a transition link secured to the free end of the mover rod and the link has secured to it a central pivot that is located to the side of the mover and towards the mounting platform from the free end of the mover rod and the pivot lies in the plane defined by the line of action of the mover and the centerline of the work piece, d) A first arm and a second arm pivotally connected to the mounting platform, and the arms are equally spaced to either side of a plane defined by the centerline of the work piece and the line of action of the mover and the arms project from the mounting platform in the direction of the work piece, and the arms have a length approximately equal to the distance between the platform and the work piece, and wherein the first arm and the second arm are pivotally secured to the mounting platform in a staggered relationship to each other so that the first arm and the second arm pivot In separate parallel planes that are perpendicular to the centerline of the work piece, e) A first link and a second link pivotally connected to the central pivot and the first link is pivotally connected to the mid-length of the first arm and the second link is pivotally connected to the mid-length of the second arm and the links are angled from the pivot towards the platform, wherein the first and second links are pivotally connected to the first and second arms near the mounting platform so that a short travel of the mover rod will result in a large movement of the first and second arms, f) a first roller carrier pivotally connected to the first arm near the free end of the arm and on the side of the arm nearest the centerline of the work piece and a second roller carrier pivotally secured to the second arm near the free end of the arm and on the side of the arm nearest the work piece and the first and second carriers have rotatably secured thereto at least two rollers and the rollers are positioned on the carriers so that when the outside perimeters of the rollers are in contact with the work piece the carriers will pivot so that the rollers are in contact with the work piece at equal distances from the centerline of the work piece, and wherein the axes of rotation of the rollers on the first roller carrier which is pivotally connected to the first arm project in the direction of the second arm and the rollers on the second roller carrier pivotally connected to the second arm project in the direction of the first arm so that the rollers are aligned with each other when the rollers are in contact with the work piece, and g) the axes of rotation of the rollers and the pivot axes of the pivots are parallel to the longitudinal centerline of the work piece.

* * * * *